J. W. FARLEY.
PIPE HANGER.
APPLICATION FILED AUG. 8, 1919.
1,362,244. Patented Dec. 14, 1920.
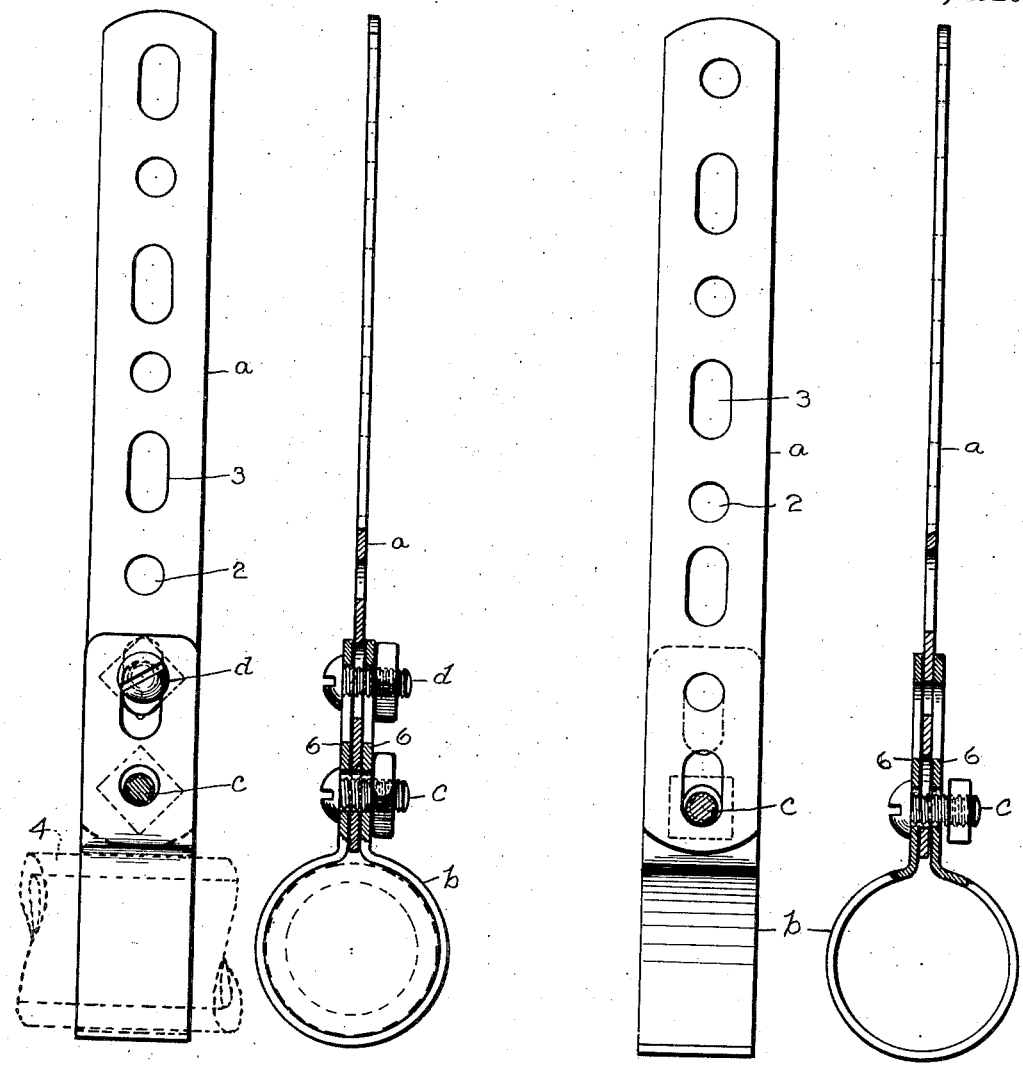
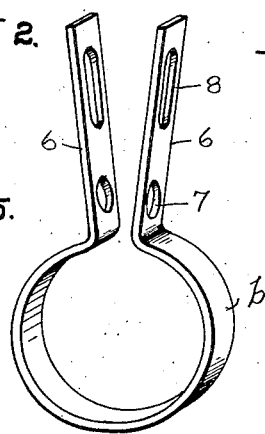
John W. Farley
Inventor
Attorneys

UNITED STATES PATENT OFFICE.

JOHN W. FARLEY, OF CLEVELAND, OHIO.

PIPE-HANGER.

1,362,244.  Specification of Letters Patent.  Patented Dec. 14, 1920.

Application filed August 8, 1919. Serial No. 316,053.

*To all whom it may concern:*

Be it known that I, JOHN W. FARLEY, citizen of the United States, residing at Cleveland, in the county of Cuyahoga and State of Ohio, have invented certain new and useful Improvements in Pipe-Hangers, of which the following is a specification.

This invention is an improvement in pipe hangers constructed and adapted especially to accommodate the hanger to different pipe levels within limits, or to take up or let out the hanger more or less when the pipes are installed and have been placed to approximate level positions with such adjustment, all substantially as shown and described and particularly pointed in the claim.

In the accompanying drawings, Figure 1 is a side elevation of the hanger and section of pipe therein and Fig. 2 is an edge elevation of Fig. 1 sectioned on the line of the screws. Fig. 3 is a side elevation and Fig. 4 an edge elevation sectioned showing different connections as compared with Figs. 1 and 2. Fig. 5 is a perspective view of the stirrup or hanger proper.

As thus shown the primary hanger element consists in a metallic strip or strap $a$, and constructed with round holes 2 and oblong slots 3 alternately and uniformly spaced apart, and one end of said strip has a terminal round hole 2 for a bolt, and the other a terminal elongated slot 3, thus adapting either end to have the hanger proper or stirrup $b$ attached thereto according as adjustment in the said hangers is wanted or not. Thus, it will be observed, that in any case I plan to employ two short fastening bolts $c$ and $d$, which are alike and interchangeable, and that in case leveling adjustment of the pipe is wanted the end with the terminal slot 3 is employed with the stirrup.

It will be noticed, also, that the hanger proper or stirrup $b$ is made out of a single strip or piece of flexible metal bent at its middle to circular form of a size and shape to accommodate the pipe 4 therein and having two flat ends or shanks 6 provided, respectively, with round holes 7 at the base of the shank and oblong slots 8 in the ends thereof, corresponding to the holes 2 and slots 3 in the strip $a$ in respect to size and spaces apart. The said stirrup is opened by bending the sides apart to engage the same over the pipe, and the said sides are then bent together again perparatory to fastening on the sides of the strip $a$. If leveling adjustment is to be made, as above indicated, the slotted end of strip $a$ is used and bolt $c$ engages through the round holes 7 in the shank of the stirrup and the slot 3 in the strip, while bolt 8 engages through slots 3 and 8 in the strip and stirrup respectively. This gives accommodation for adjustment equal to the length of the said slots, which ordinarily is sufficient, assuming that the pipe has otherwise been brought approximately to the desired level in advance of such adjustment. On the other hand if no leveling adjustment is required I employ the end of the hanger strip $a$ having the terminal round hole 2 which comes into relations with the round holes in the stirrup shank and is bolted therewith accordingly.

The strip $a$ has no fixed length, but is cut to length according to conditions as they are found when the pipe is to be hung, it being understood that the strip is stamped up with the perforations 2 and 3 in sufficient lengths to begin with to warrant cutting to shorter lengths as hanging may require and according to various conditions.

The upper ends of the hanger strips may be provided with any suitable suspensory means according to conditions in any given case, and the respective holes 2 and slots 3 are used in such connections. The said strips are flexible and sometimes they are bent to more or less angle to make the suspensory fastenings.

What I claim is:

In pipe hangers, a flat metallic strip adapted to be severed to different lengths and to be bent and having a line of oblong slots and round holes alternately from end to end on a median line and equally spaced apart, one end of said strip having a slot and the other a round hole, and a loop shaped stirrup in a single piece adapted to support a pipe therein and having flat opposed extremities provided each with a slot in its end and a round hole next to the loop of the stirrup, and said slots and holes spaced apart equally with the slots and holes in said strip, and a pair of bolts through said slots and holes securing said parts together.

Signed at Cleveland, in the county of Cuyahoga and State of Ohio, this 2nd day of August, 1919.

JOHN W. FARLEY.